United States Patent [19]

Termote

[11] 4,448,795

[45] May 15, 1984

[54] PROCESS OF CONCENTRATING ACID WHEY

[75] Inventor: Frank A. A. Termote, Veghel, Netherlands

[73] Assignee: DMV-Campina B.V., Veghel, Netherlands

[21] Appl. No.: 369,017

[22] PCT Filed: Aug. 12, 1981

[86] PCT No.: PCT/NL81/00021

§ 371 Date: Apr. 7, 1982

§ 102(e) Date: Apr. 7, 1982

[87] PCT Pub. No.: WO82/00570

PCT Pub. Date: Mar. 4, 1982

[30] Foreign Application Priority Data

Aug. 14, 1980 [NL] Netherlands ................. 8004614

[51] Int. Cl.$^3$ .................. A23C 1/04; A23C 21/00

[52] U.S. Cl. ................. 426/471; 159/17 VS; 426/491

[58] Field of Search .......... 426/491, 492, 471; 159/13 A, 17 VS, 27 A

[56] References Cited

U.S. PATENT DOCUMENTS

| 3,431,113 | 3/1969 | Braatz | 426/471 |
| 3,537,860 | 11/1970 | Moore et al. | 426/491 |
| 4,016,028 | 4/1977 | Young et al. | 159/17 VS |
| 4,202,909 | 5/1980 | Penderson, Jr. | 426/491 |
| 4,364,794 | 12/1982 | Lankenau | 159/17 VS |

*Primary Examiner*—George Yeung

[57] ABSTRACT

Process for the concentration of acid whey to a dry solids content above 45% by weight under reduced pressure in at least two separate phases. Between at least two of these phases partially concentrated whey is stored for an adjustable average residence time of at least 30 minutes at a temperature above 35° C., most preferably of 40° to 60° C.

9 Claims, No Drawings

PROCESS OF CONCENTRATING ACID WHEY

The invention relates to a process and an apparatus for the concentration of acid whey to a dry solids content of more than 45% by weight.

Whey is the product, which is obtained after precipitation and separation of casein containing milk proteins from milk. When the precipitation is effected by the action of enzyms, the produkt after the separation of the casein is called sweet whey. When the milk is acidified by fermentation or acid is added to the milk, the product obtained after separation of casein is called acid whey. In the latter case the undissolved calcium salts present in the milk are dissolved due to the reduction of the pH, so that acid whey contains considerably more dissolved salts than sweet whey.

When processing whey, which in most cases contains about 6% by weight of dry solids, to form whey concentrate or whey powder and in the preparation of lactose from whey a considerable amount of water must be removed from the whey. Initially the water was evaporated from the whey with one stage evaporators according to the recycle principle, lateron multistage evaporators were used (M. T. Gillies, "Whey Processing and Utilization", Noyes Data Corporation, Park Ridge, N.J. and London (1974), pages 24–29). Before the evaporation the whey may be maintained some time at a temperature of 65°–74° C. in order to prevent bacterial growth and development of acid and thereafter be preheated at 87°–96° C. and, if desired, be pasteurized. Thereby the whey proteins are denatured and the lactose is brought to crystallization. The whey is concentrated to a dry matter content of 40–50% by weight and thereafter dried with a spray dryer.

Evaporation of whey with the use of an number of vacuum evaporators in series to a dry solids content upto 70% by weight is known from John R. Spellacy, "Casein, dried and condensed whey", Lithotype Process Co., San Francisco (1953), pp. 489, 490, 491, 500 and 501.

From Earl O. Whittier and Byron H. Webb, "By-products from Milk", Reinhold Publishing Corporation, New York, (1950), pp. 298, 299 and 305–307 a process is known, in which casein whey is heated with steam to boiling with the addition of a small amount of milk of lime, whereby the whey proteins coagulate and form together with calcium phosphate a sludge at the bottom of the tank.

The separated clear whey is thereafter concentrated under reduced pressure in two or three steps to a dry solids content of 34–38% by weight. The syrup obtained is filtered in a filter press to remove the separated proteins and salts. By the denaturation of proteins the viscosity rises namely, which causes difficulties during the further concentration. The filtered syrup, which thereafter does not contain whey protein, but only lactose, is further concentrated to a dry solids content of about 70% by weight.

From Dairy Science Abstracts 1977, vol. 39, nr. 4, p. 212, abstract 1855 it is known to concentrate whey to a dry solids content of more than 45% by weight, to cool subsequently the concentrated whey to 27°–30° C. and to maintain it at this temperature under agitation for 8–12 hours, whereby the lactose present in the whey crystallizes. The whey with the crystallized lactose is then heated and spray-dried.

To speed up the concentrating of the whey at less higher temperature, whereby the denaturation of the whey proteins causes less trouble, now also falling-film evaporators are used. Thus, in Dairy Science Abstracts, vol. 39, nr. 4 (1977), p. 212, abstract 1854 a process has been described, wherein whey having a dry solids content of 6% by weight is concentrated in an equipment consisting of several falling-film evaporators to a dry solids content of 36% by weight. According to the German "Offenlegungsschrift" No. 2,538,336 milk and milk products are evaporated in an equipment consisting of a number of evaporators. In at least one evaporator the material to be concentrated is evaporated in a rising stream, whereafter in one or more following evaporators the operation is carried out according to the falling film principle.

Whey, which has been evaporated in this way, will contain only little or no denatured protein. When, however, the heating surface of the evaporator(s) becomes fouled and the temperature must be raised to continue the evaporation, nevertheless denaturation takes place, whereby the rate of fouling increases more.

Such a fouling of the surfaces of an evaporating apparatus especially takes place when concentrating acid whey. Such as is known from the Netherlands Patent Specification No. 132,095 calcium salts of phosphoric acid and citric acid present in the whey are present in a well soluble form at pH values below 4,7 it is true, the acid radicals being dissociated only one time, but it has appeared in practice that nevertheless calcium containing precipitates are formed on the surface of an evaporating apparatus. This holds especially for acid whey obtained after precipitation of casein with sulphuric acid, but also other types of casein whey as well as cheese whey originating from a cheese preparation process, in which the formation of lactic acid plays a part, show a much stronger fouling during concentration than sweet whey.

In addition to calcium in the deposits upon the evaporator surface phosphate, sulphate and organic compounds, like sugar type and protein type substances, can be found. These deposits occur especially at those places, were the dry solids content in the whey is high. Already after some hours of evaporation the heat transfer of the evaporator surfaces decreases and after 5 to 6 hours of evaporation the evaporation must be interrupted due to excessive fouling.

In order to avoid these disadvantages it has been proposed according to the Netherlands Patent Application No. 7.810.035 to remove calcium from the whey to be processed with the aid of an acid ion exchanger in the sodium or potassium form and to regenerate the ion exchanger used with the aid of a liquid obtained at a later stage of the whey processing.

It has been found that the fouling of the evaporating equipment when concentrating acid whey to a dry solids content above 45% by weight by evaporation under reduced pressure with the aid of continuous evaporators is reduced considerably without treatment with ion exchanger, when according to the invention the concentration is carried out in at least two separate phases and between at least two of these phases the already partially concentrated whey is stored in a storage zone for an adjustable average residence time of at least 30 minutes at a temperature above 35° C.

Each separate phase of the concentration can be carried out in one of more evaporation steps. This can occur in several ways.

Thus, an evaporating equipment may be used consisting of a series of evaporator units connected with each other in such a way that the vapour obtained in a evaporator unit serves as heating agent for the next evaporating unit. Each evaporating unit is provided with a cooling device for the separated product from which the concentrated liquid phase is withdrawn to a next evaporator unit and the vapour is used for the heating of a preceding evaporator unit. Thus theoretically in such a process only to the last evaporator unit a heating agent, such as steam, need to be added, the heat content of which is then always transferred to a preceding evaporator unit through the vapour.

As evaporator unit several types of evaporators can be used, such as circulation evaporators and preferably falling-film evaporators. In the process of the invention partially concentrated whey coming from one of the evaporator units is withdrawn and stored in a separate zone, e.g. in a so called buffer tank. After a storage of at least 30 minutes the partially concentrated whey is fed into a next evaporator body.

In the process of the invention also multi-stage evaporators can be used consisting of several evaporation stages each provided with a cooler with vapour separator and withdrawal conduits for vapour and liquid. According to the invention the partially concentrated whey obtained from a stage can be withdrawn from such a vapour separator belonging to a evaporation stage and stored for at least 30 minutes in the storage zone and thereafter fed again to a next evaporation stage.

For heating the evaporating equipment in most cases steam is used, although also other heating agents can be used. In general the heating takes place in a indirect way.

The temperature in the evaporators is determined by the equipment available and the purpose aimed at. Because denaturation of the proteins in the whey must be avoided as much as possible, the temperature is generally not higher than 80° C., preferably 40° to 70° C. and especially 40° to 60° C.

The pressure in the evaporators is dependent on the temperature and the desired degree of concentration. The conditions of temperature and pressure in general do not deviate from the conventional conditions.

The temperature in the storage zone is usually determined by the temperature of the evaporator units or evaporating stages and is therefore preferably 40° to 70° C. and especially 40° to 60° C. It is desired to maintain the temperature in the storage zone as much constant as possible and, of course, preferably as much as possible heat loss is prevented during the storage period.

Fouling is most pronounced in the evaporator units or evaporating stages, in which the dry solids content is the greatest. For that reason it is preferred, especially when the whey should be concentrated to a dry solids content of more than 60% by weight, to store the whey in a storage zone, when the dry solids content is 45 to 55% by weight. Because, however, also in the evaporator units or evaporating stages, in which the content of this substance is not so great, a rather substantial fouling occurs, in addition thereto the storage of whey having a dry solids content of 30 to 45% by weight in a storage zone is desired. If the whey is not further concentrated than to a dry solids content of 45 to 50% by weight, it is sufficient to store whey having a dry solids content of 30 to 45% by weight in a storage zone. When strongly concentrating the whey one proceeds for example in such a way that the concentration is carried out in three phases, after the first phase whey having a dry solids content of 30 to 45% by weight is stored in a storage zone for an adjustable average residence time of at least 30 minutes at a temperature in the range of 40° to 60° C., subsequently the whey is further concentrated in a second phase, thereafter the whey having a dry solids content of 45 to 55% by weight is stored in a storage zone for an adjustable average residence time of at least 30 minutes at a temperature in the range of 40° to 60° C. and finally in the third phase whey is concentrated to a dry solids content of 55 to 70% by weight.

The average residence time of the partially concentrated whey in the storage zone must be adjustable, so that it is prevented that the whey is flowing to the next evaporating step or the next evaporator unit respectively directly through the storage zone. In practice an average residence time of 1 to 5 hours is desired, dependent on the equipment used and the dry solids content of the partially concentrated whey.

By carrying out the concentration of the whey in at least two separate phases and the insertion of an storage period of the partially concentrated whey between two evaporating phases it is achieved that the fouling of the evaporator surfaces when processing whey having a rather great dry solids content is reduced considerably, while nevertheless the total effect of the evaporating equipment need not to be disturbed, because the dry solids content in the partially concentrated whey and the temperature thereof need not undergo a change.

The fouling in an evaporator unit is measured with reference to the heat transfer. When no fouling occurs, the heat transfer remains constant and also the water evaporating capacity remains constant without the need of further adjustment of the temperature or the throughput. Thereby the temperature throughout the evaporating apparatus can be maintained at such a low value, that denaturation of proteins does not occur. Thereby the whey concentrate contains the whey protein finally substantially completely in a non-denaturated state. This means that the whey concentrate has a high content of soluble protein. In the preparation of lactose from the whey concentrate the separation between crystallized lactose and the other whey ingredients can take place better.

The resulting whey concentrate can be dried in the conventional way to whey powder, e.g. by means of spray-drying, and/or be processed to lactose.

The invention also relates to a apparatus for carrying out the above described process, consisting of an apparatus for the evaporation in at least two zones, in which the first zone is provided with an inlet for starting material and each zone is provided with a cooling device for the product withdrawn from said zone and a vapour separator as well as with the conventional means for the transport of liquid and vapour and for measuring and controlling the temperature, pressure and liquid- or vapour rate and other conditions. The apparatus according to the invention is characterized in that between at least two different evaporating zones a storage zone is present, provided with an inlet for liquid originating from the preceding evaporating zone, with an outlet to the next evaporating zone and with means for storing liquid for an adjustable average residence time at a predetermined temperature Preferably the storage zone is a vessel with means for controlling temperature and residence time.

The following examples explain the invention. Therein the fouling is determined with reference to the heat transfer coefficient, the so called K-value. This K-value is calculated from the formula:

$$K = \frac{Q \cdot V}{\Delta T \cdot O}$$

in which Q represents the amount of separated condensate in kg/h per body, $\Delta T$ represents the temperature difference in °C, 0 the size of the heating surface in $m^2$ and V the evaporation heat of water in kJ/kg.

EXAMPLE I

Acid whey having a dry solids content of 6.0% by weight, obtained after acidification of skim milk with hydrochloric acid to a pH of 4.5 and separation of the casein precipitated thereby, was concentrated to a final dry solids content of 60% by weight with an evaporating equipment comprising totally 7 evaporator units according to the falling-film principle in series. The whey concentrate from the fifth evaporator unit having a dry solids content of 48% by weight and a temperature of 50° C., was passed through a tank, before it was pumped into the sixth evaporator unit. The residence time of the partially concentrated whey in this tank was on the average 1 hour. After 4½ hours of evaporation the K-value of the sixth and seventh evaporator unit appeared to be reduced with 14%. When the average residence time in the tank was 5 hours, the K-value in the last two evaporator units appeared to be reduced with 10% after 4½ hours of evaporation. With a residence time of on the average 8 hours no reduction of the K-value was found after 8 hours.

If on the contrary the whey concentrate from the fifth evaporator unit was passed immediately, therefore without storage in a storage zone, to the sixth evaporator unit, the K-value of the last two units appeared to be reduced with 36% after 4½ hours of evaporation.

EXAMPLE II

Acid whey having a dry solids content of 5,9% by weight, obtained by acidification of skim milk with sulphuric acid to a pH of 4.5 and separation of the casein precipitated thereby, was concentrated to a dry solids content of 60% by weight of the final product with the same equipment as used according to Example I. The whey concentrate coming from the fifth evaporator unit had a dry solids content of 47% by weight and a temperature of 52° C. With a residence time of this concentrate of on the average 1 hour in a storage tank the value of the K-value of the next evaporator unit appeared to be reduced with 12% after 4.6 hours of evaporation. With a residence time of on the average 6 hours the K-value appeared to remain constant for 7.5 hours of evaporation.

EXAMPLE III

The same whey as described in Example II was treated with a similar equipment as described in example II, but now the concentrate from the fourth evaporator unit having a dry solids content of 38% by weight and a temperature of 52° C. was stored for on the average 5.5 hours in a tank before being passed to the fifth evaporator unit. As appeared from the fact that the K-value on the fifth evaporator unit remained constant, in that unit no fouling occurred for 5 hours of evaporation. Without the storage of the partially concentrated whey the K-value of the fifth evaportor unit appeared to decrease with 30% in 5 hours.

I claim:

1. A method for the processing of acid whey which comprises continuously evaporating acid whey, under conditions substantially avoiding denaturation of whey proteins, in a series of at least two separate evaporation phases to obtain a concentrated liquid whey; subjecting the partially concentrated liquid whey obtained in each preceding evaporation phase to evaporation in a subsequent evaporation phase; storing the partially concentrated liquid whey, obtained from at least one of said preceding evaporation phases and having a dry solids content of at least 30% by weight, in a storage zone for at least 30 minutes at a temperature above 35° C.; further subjecting the partially concentrated liquid whey, after storage, to evaporation in a subsequent evaporation phase; recovering from the last evaporation phase a concentrated liquid whey product having a dry solids content above 45% by weight; and spray-drying said whey product.

2. A method for the processing of acid whey which comprises continuously evaporating acid whey, under conditions substantially avoiding denaturation of whey proteins, in a series of at least two separate evaporation phases to obtain a concentrated liquid whey; subjecting the partially concentrated liquid whey obtained in each preceding evaporation phase to evaporation in a subsequent evaporation phase; storing the partially concentrated liquid whey, obtained from at least one of said preceding evaporation phases and having a dry solids content of at least 30% by weight, in a storage zone for at least 30 minutes at a temperature above 35° C.; further subjecting the partially concentrated liquid whey, after storage, to evaporation in a subsequent evaporation phase; recovering from the last evaporation phase a concentrated liquid whey product having a dry solids content above 45% by weight; and effecting lactose crystallization from said whey product.

3. The method according to claim 1 or 2, wherein each of the evaporation phases is carried out in a separate evaporator unit.

4. The method according to claims 1 or 2, wherein each of the evaporation phases is carried out in a single multistage evaporator, and the partially concentrated liquid whey which is to be stored is withdrawn from said multistage evaporator for storage and subsequently returned to said multistage evaporator for further evaporation in a subsequent stage in said multistage evaporator.

5. The method according to claims 1 or 2, wherein the partially concentrated liquid whey is stored at a temperature of about 40° C. to about 70° C.

6. The method according to claims 1 or 2, wherein the partially concentrated liquid whey is stored at a temperature of about 40° C. to about 60° C.

7. The method according to claims 1 or 2, wherein the stored partially concentrated liquid whey has a dry solids content of about 30% to about 45% by weight.

8. The method according to claims 1 or 2, wherein the stored partially concentrated liquid whey has a dry solids content of about 45% to about 55% by weight.

9. The method according to claims 1 or 2, which includes a first, second and third evaporation phase, and wherein the partially concentrated liquid whey obtained from said first evaporation phase has a dry solids content of about 30-45% by weight which is stored in a storage zone for at least 30 minutes at a temperature of about 40° C. to 60° C.; and the partially concentrated liquid whey obtained from said second evaporation phase has a dry solids content of about 45–55% by weight and is stored in a storage zone at a temperature of about 40° C. to about 60° C., and the partially concentrated liquid whey after storage is further subjected to evaporation in said third evaporation phase to form a concentrated liquid whey product having a dry solids content of about 55–70% by weight.

* * * * *